(12) United States Patent
Almant

(10) Patent No.: US 9,883,683 B2
(45) Date of Patent: Feb. 6, 2018

(54) FILTER PAPER POD WITH A COFFEE COMPOSITION

(71) Applicant: Kraft Foods R & D, Inc., Deerfield, IL (US)

(72) Inventor: Julie Almant, Banbury (GB)

(73) Assignee: Kraft Foods R&D, Inc., Deerfield, IL (US)

( * ) Notice: Subject to any disclaimer, the term of this patent is extended or adjusted under 35 U.S.C. 154(b) by 194 days.

(21) Appl. No.: 14/655,306

(22) PCT Filed: Jan. 29, 2015

(86) PCT No.: PCT/IB2015/000115
§ 371 (c)(1),
(2) Date: Jun. 24, 2015

(87) PCT Pub. No.: WO2015/124981
PCT Pub. Date: Aug. 27, 2015

(65) Prior Publication Data
US 2016/0255855 A1    Sep. 8, 2016

(30) Foreign Application Priority Data
Feb. 24, 2014  (GB) .................................. 1403184.3

(51) Int. Cl.
*A23F 5/14* (2006.01)
*A23F 5/08* (2006.01)
(Continued)

(52) U.S. Cl.
CPC .................. *A23F 5/14* (2013.01); *A23F 5/08* (2013.01); *A23F 5/125* (2013.01); *A23F 5/26* (2013.01); *B65D 85/8046* (2013.01)

(58) Field of Classification Search
CPC ...... A23F 5/08; A23F 5/14; A23F 5/26; A23F 5/125; B65D 85/8046
See application file for complete search history.

(56) References Cited

U.S. PATENT DOCUMENTS 5,108,768 A * 4/1992 So ..................... B65D 85/8043
 206/519
6,207,211 B1 * 3/2001 Wasserman ............... A23F 5/04
 426/466

(Continued)

FOREIGN PATENT DOCUMENTS

EP  0756844 A1  2/1997
EP  0985350 A2  3/2000

(Continued)

OTHER PUBLICATIONS

Horiba Scientific. Understanding and Interpreting Particles Size Distribution Calculations. 1996. http://www.horiba.com/scientific/products/particle-characterization/education/general-information/data-interpretation/understanding-particle-size-distribution-calculations/.*

(Continued)

*Primary Examiner* — Anthony Weier
(74) *Attorney, Agent, or Firm* — Fitch, Even, Tabin & Flannery LLP

(57) ABSTRACT

The present invention relates to a composition for making a coffee beverage, the composition having
 roast and ground coffee having a X50 of from 700 to 1250 µm; and
 a milk powder with a X50 of from 50 µm to 3 mm;
 wherein the ratio by weight of the roast and ground coffee to the milk powder is from 4:1 to 2:3.

18 Claims, 2 Drawing Sheets

(51) Int. Cl.
  *A23F 5/12* (2006.01)
  *B65D 85/804* (2006.01)
  *A23F 5/26* (2006.01)

(56) References Cited

U.S. PATENT DOCUMENTS

| | | | |
|---|---|---|---|
| 8,147,886 B2 | 4/2012 | Steenhof et al. | |
| 9,155,319 B1* | 10/2015 | Perlman | A23F 5/08 |
| 2003/0077372 A1 | 4/2003 | Sargent et al. | |
| 2005/0183578 A1* | 8/2005 | Mandralis | A47J 31/0673 |
| | | | 99/279 |
| 2007/0160736 A1 | 7/2007 | Day | |
| 2010/0009039 A1* | 1/2010 | Robinson | A23F 5/405 |
| | | | 426/72 |
| 2010/0260895 A1* | 10/2010 | Yoakim | B65D 85/8043 |
| | | | 426/77 |
| 2012/0164277 A1 | 6/2012 | Robinson et al. | |
| 2013/0071522 A1* | 3/2013 | Mistry | A23F 5/12 |
| | | | 426/77 |
| 2014/0272018 A1* | 9/2014 | Koller | B65D 85/8043 |
| | | | 426/115 |
| 2014/0348984 A1* | 11/2014 | Zeller | B65D 85/8043 |
| | | | 426/115 |
| 2014/0370181 A1* | 12/2014 | Young | A23F 5/02 |
| | | | 426/595 |
| 2015/0135967 A1* | 5/2015 | Hoffman | B65D 85/8043 |
| | | | 99/295 |

FOREIGN PATENT DOCUMENTS

| | | |
|---|---|---|
| EP | 1440644 A1 | 7/2004 |
| WO | 02074143 A2 | 9/2002 |
| WO | 2006043102 A1 | 4/2006 |
| WO | 2011039027 A1 | 4/2011 |

OTHER PUBLICATIONS

Particle Sizing of Coffee Grounds. No date provided. http://www.ebatco.com/Ebatco%20Site/lab%20services/ebatco%20pdfs/Particle%20Sizing%20of%20Coffee%20Grounds.pdf.*
Brewing Science Level: Expert. 2017. https://www.syhcoffee.com/blogs/brewing-science/105490630-brewing-science-level-expert.*
Search Report dated Jul. 30, 2014 for Application No. GB1403184.3 (4 pgs.).
International Search Report and Written Opinion of the International Searching Authority dated Apr. 15, 2015 for International Application No. No. PCT/IB2015/000115 (8 pgs.).
Canadian Examination Report dated May 31, 2016 for Canadian Patent Application No. 2,894,998 (5 pgs.).
Gevalia "Maxwell House Cafe Collection Creme Cappuccino" retrieved Jun. 14, 2016 from http://www.gevalia.com/maxwell-house-cafe-collection-creme-cappuccino-NE5.html (3 pgs.).

* cited by examiner

FILTER PAPER POD WITH A COFFEE COMPOSITION

This disclosure relates to a coffee beverage composition containing roast and ground coffee and milk powder. In particular, the disclosure relates to a composition for use in a capsule or filter pod which gives a good tasting final beverage in a single preparation step.

It is known to provide coffee beverages, such as cappuccinos or lattes, from single coffee mixes. These typically contain a blend of soluble coffee and milk powder and may be provided in stick-packs. It is also known to produce such beverages using roast and ground coffee in beverage preparation machines and there are a number of approaches adopted to ensure that the final beverage has an authentic and pleasurable taste and appearance.

As discussed in EP0756844, there are various problems which arise from the mixing of roast and ground coffee with a soluble beverage ingredient. In particular, the dissolution of the soluble beverage ingredient, such as creamer, can hinder the extraction of the roast and ground coffee, leading to a poor final flavor. In EP0756844 the solution to this problem is to place the roast and ground coffee in one filter pad and a creamer in another. This approach is commonplace in the market and it is known to produce a latte in a single brewing step from a coffee filter pod and a milk powder pod.

Another approach is set out in U.S. Pat. No. 8,147,886, which employs a form-retaining pad having a stiffening insert. The roast and ground coffee is arranged in the pad above an insert which is filled with soluble ingredients. In this way the coffee is extracted first and remains supported, even once the soluble ingredients have been flushed from the pad. Even so, the ingredients are held in separate portions of the pad and the pad design involves a complex additional component.

WO02074143 describes an alternative approach using a rigid brewing capsule having one or more extraction chambers. As discussed in this document, the use of a particular particle size of the roast and ground coffee leads to improved turbidity in the mixing space of the capsule and, as a consequence, a better final beverage.

US2003/0077372 discloses a flavored coffee composition.

EP0985350 discloses a soluble coffee having an intensified flavor and color.

EP1440644 discloses a machine for the preparation of beverages.

US20070160736 discloses a brewable coffee product.

US2012/0164277 discloses a dairy-containing beverage with enhanced flavors and textures.

Accordingly, there is a desire for an alternative composition which allows for the preparation of a good-tasting beverage in a single step, especially from a container, in particular a filter pod, and/or which tackles at least some of the problems associated with the prior art or, at least, provides a commercially useful alternative thereto. It is especially desired to provide a composition which extracts fully to give a milky coffee beverage in a single preparation step.

According to a first aspect, the present disclosure provides a composition for making a coffee beverage, the composition comprising:

roast and ground coffee with a X50 of from 700 to 1250 µm; and
a milk powder with a X50 of from 50 µm to 3 mm;
wherein the ratio by weight of the roast and ground coffee to the milk powder is from 4:1 to 2:3.

That is, the particle size distribution of the roast and ground coffee has a X50 by volume of from 700 to 1250 µm and the milk powder has a particle size distribution with a X50 by volume of from 50 µm to 3 mm.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Compositions for making a coffee beverage are well known in the art. By coffee beverage it is meant a ready-to-drink formulation for preparing a milky coffee, such as a latte or a cappuccino. Other coffee beverages containing milk are also well known, such as a flat white and similar. The composition will be in the form of a dry powder, including extractable roast and ground coffee and soluble milk powder, together with any other ingredients.

The composition comprises roast and ground coffee and milk powder having particular particle size distributions. As will be appreciated, whenever a powder form is provided, the particles which make up the powder will have a range of sizes. The distribution can be affected by the grinding technique (especially for coffee), the spray-drying technique (especially for milk powders), as well as by additional sieving, milling and filtering steps which can optionally be performed.

The particle size distribution (specifically a volume distribution density curve) is determined using a laser diffraction technique on the dry particles. This technique can be used to determine a cumulative distribution. The cumulative distribution can be converted into a volume distribution density curve. Such techniques are well known in the art and further details are provided in the Examples. The particle size distribution of the ground coffee can be measured using the laser diffraction software to determine the range of particle sizes and any peaks.

It has now become commonplace to characterise coffee grinds by using laser diffraction techniques. For example, a Helos dry system can be readily used to determine the characteristics of a coffee powder or a milk powder or a blend. This provides values such as the X50, X10 and X90, as discussed herein. Unless otherwise stated, these values are radiuses which split fractions of the total particle volume distribution.

The value of the X50 is the radius in a distribution by volume, where half of the particles have a greater volume and half of the particles have a lesser volume. The X10 is the radius in a distribution by volume, where 90% of the particles have a greater volume and 10% of the particles have a lesser volume. The X90 is the radius in a distribution by volume, where 10% of the particles have a greater volume and 90% of the particles have a lesser volume.

The values of X50 help to characterise the general properties of a powder. The values of X10 and X90 help to characterise the spread of the particle sizes. When the numbers are close together, the powder has a narrower range of particle sizes.

The particle size distributions and their peaks for coffee are particularly characteristic of the grinding technique employed and the final beverage which will be produced. As a general rule, the more finely ground the coffee, the stronger the beverage which will be produced. This is why drip fed coffee percolators typically may use coarsely ground coffee; typically high pressure brewing machines use a finer grind (around 450 μm) because the time for extraction is more limited; typically low pressure systems home systems use even finer grinds (around 350 μm) due to the limited time and less favorable extraction conditions; and typically espressos are produced with finer grinds (even as low as 200 μm).

The present inventors were seeking to tackle the problem of poor powder dissolution and reduced extraction from combined coffee and milk powder filter pods. They were surprised to discover that, although a coffee grind conventionally used in a low-pressure brewer would mis-brew, they could achieve a high level of powder dissolution and a full flavor beverage from a coarser grind of coffee mixed with milk powder. This was even the case in a low pressure brewing machine. The inventors had expected that the lower surface area of the coarser coffee would lead to a reduced extraction. However, it was found that the interaction between the milk powder and coffee led to a desirable beverage being formed. Without wishing to be bound by theory, it was considered that the coarser coffee provided an improved network of flow channels through the coffee during brewing for the dissolution of the milk powder. Surprisingly, there was also sufficient surface area of the coffee to allow a normal level extraction. This improved dissolution prevented the beverage medium circumventing the bulk of the coffee bed, as can happen in some brewing cycles.

The inventor found that the composition provided the expected level of caffeine that would be achieved with the coffee alone. The level of lactose in the final beverage was increased compared to that which was achieved with finer coffee blends.

The roasted coffee is ground to a particle size distribution having a X50 by volume of from 700 to 1250 μm, more preferably 750 to 1000 μm. Preferably the particle size distribution of the coffee has a X50 of 800 to 950 μm and more preferably 850-900 μm. It has been found that these particle size ranges provide a flavorful milky beverage. With a smaller size, the beverage is prone to being unduly weak and mis-brews in a beverage machine, due to pressure build up. With a larger size of grind the extraction levels are generally unsatisfactorily low.

Preferably the particle size distribution of the coffee has a X10 of from 250 to 400 μm and preferably about 330 μm. Preferably the particle size distribution of the coffee has a X90 of from 1500 to 2000 μm and preferably about 1825 μm. This narrow range of particle sizes for the coffee has been found to maximise the extraction yield obtained from the coffee and give a strong final beverage flavor.

The composition comprises a milk powder. Milk powders are well known in the art and are formed by the drying of whole or skimmed milks by evaporation. Milk powders are commercially available. Powdered milk includes dry whole milk, nonfat dry milk, dry buttermilk, dry whey products and dry dairy blends.

The milk powder in the present composition has a particle size distribution having a X50 of from 50 μm to 3 mm, preferably 1 to 3 mm.

The most preferred milk powder has an X50 of from 1 to 3 mm. This particle size is preferably associated with a X10 of 600 to 800 μm, preferably about 700 μm. Preferably the particle size distribution of the milk powder has a X90 of 3500 to 4500 μm, preferably about 4000 μm. This narrow range of particle sizes for the milk powder has been found to maximise the milky flavor obtained during brewing and give a strong final beverage flavor.

Other suitable milk powders include finer powders having an X50 of from 50 μm to 1 mm, preferably from 50 to 250 μm. The X10 for such powders is preferably from 10 to 50 μm and the X90 is preferably from 300 to 950 μm. These finer milk powders are less preferred.

The composition contains the ground coffee and the milk powder in a ratio by weight of from 4:1 to 2:3. When the ratio falls outside of these ranges, the beneficial effects are not observed. Instead it is found that the coffee is weak, either because of a lack of coffee, or a poor extraction of the large amount of coffee present, presumably due to its coarse size. Preferably the ratio by weight of the roast and ground coffee to the milk powder is from 7:3 to 1:1 and more preferably about 3:2.

Optionally the composition further comprises sugar in an amount of up to 25% by weight of the total composition. It has been found that the precise amount of sugar is not critical since it does not affect the extraction of the beverage. The presence of the sugar provides a good tasting beverage in a single step. It is especially preferred that any sugar is provided as granulated sugar because the large crystal sizes do not interfere with the extraction of the beverage.

Preferably the composition further comprises one or more flavorings, preferably selected from cream, almond, amaretto, anise, apple, brandy, caramel, cider, cinnamon, cherry, chocolate, mint, cocoa, panna, cream, milk, crème de menthe, French vanilla, grape, hazelnut, soluble coffee, Irish cream, lemon, macadamia nut, orange, peach, peppermint, pistachio, strawberry, vanilla, wintergreen or a mixture of two or more thereof. Preferably the one or more flavorings are present in an amount of less than 5 wt %, preferably less than 1 wt %, of the composition.

The composition may additionally contain minor amounts of other ingredients such as stabilisers, anti-caking agents, hydrocolloids, thickeners, free-flow agents such as lecithin, maltodextrin, sweeteners, foaming agents or glucosyrup. All of these beverage additives are well known in the art.

Preferably the composition consists of the roast and ground coffee and milk powder, and, optionally, sugar and one or more flavorings, together with unavoidable impurities. That is, preferably the composition has less than 10 wt %, preferably less than 5 wt %, more preferably less than 1 wt % and, more preferably, essentially no other ingredients.

Surprisingly the inventors have found that the roasting color of the beans can have an effect on the extraction of the final beverage formed from the composition. In particular, the roasting color affects the extraction yield and flavor to a greater extent than would be expected, when in the presence of the milk powder as described herein. Preferably the roast and ground coffee has a color of 4-10 La, more preferably from 5-8 La. Lange is a commonplace measurement for determining the color of roasted coffee and machines for taking measurements are well known in the art. A suitable measurement device is the DR LANGE, LK100. The color of a coffee sample is measured by light reflectance at 640 nm on a scale equivalent to the L, a, b system. A value for the reflectance of the sample is obtained by comparison with standard tiles.

Preferably the roast and ground coffee is formed from 50 to 100% Arabica coffee beans and the balance Robusta coffee beans. It has been found that the flavor of the coarser coffee grind requires an increased level of the Arabica coffee to provide a good tasting beverage.

In one embodiment, the roast and ground coffee is formed from Arabica coffee beans and has a particle size distribution having a X50 of about 900 μm and a color of about 9.5 La, and the ratio by weight of the roast and ground coffee to the milk powder is about 3:2.

According to a further aspect there is provided a container comprising the composition disclosed herein. Preferably the container is a container for a beverage preparation machine. Such containers are well known in the art and include various pods, pads, capsules and cartridges. Preferably the container is a filter paper pod.

Filter paper pods are especially preferred and it is surprising that the beneficial extraction is observed, even within the constraints of the pad where no strong mixing or turbidity can be observed. Filter paper pods are well known in the art and comprise first and second sheets of filter material sandwiching the ingredients and sealed around the periphery. It is especially preferred that the pod does not include any rigid inserts, since these are expensive and unnecessary for the present composition.

The container is preferably a single-serve beverage container. Preferably the fill weight of the composition in the container is 4-25 g, preferably 6 to 15 g, more preferably 10-14 g and most preferably about 12.5 g. In this way a single desirable beverage can be made from each container. For a soft container such as a filter pad, the fill weight is preferably from 10-14 g. For a hard capsule, the fill weight will typically be lower (4-10 g) since a higher pressure can be used when dispensing.

According to a further aspect there is provided a method for the manufacture of the composition disclosed herein, the method comprising:
grinding roasted coffee beans, and
mixing the roast and ground coffee with a milk powder,
the method optionally further comprising filling the composition into a container.

As will be appreciated, the grinding will be by any known technique suitable to arrive at the particle size distributions discussed herein. By way of example, a suitable grinding technique would be using roller or disc type grinders.

According to a further aspect there is provided a method of manufacturing a beverage in a beverage preparation machine, the method comprising: introducing the container described herein into a beverage preparation machine; and passing an aqueous medium through the container to produce a beverage.

The aqueous medium will typically be water, although another prepared beverage may also be used, such as from another container. The medium is preferably heated, and may be heated to a temperature of from 70 to 95° C.

The container is preferably suitable for producing a beverage having a volume of 70 to 250 ml, preferably from 100 to 120 ml.

The total solids of the beverage using the composition disclosed herein is preferably from 16-20%, preferably about 18%. Beverage yields are commonly calculated in the art and it is known that these levels of extraction are typically preferred for a good flavor of coffee.

The extractable solids contained in the beverage sample are expressed in grams per 100 g of dry matter. They are calculated as follows (Equation 1):

$$\text{Extractable solids }(\%) = \frac{S \times E}{100}$$

Where:
S is the solids in the brew aliquot measured by densitometry, in %
E is the weight of coffee sample extracted, in g
The solids extracted from the coffee sample depend on the type of percolator used; therefore a percolator brew yield calculation is hereby proposed (Equation 2):

$$\text{Brew yield}(\%) = \frac{\text{Extractable solids}}{W}$$

Where W is the weight of sample before extraction.

According to a further aspect there is provided a kit comprising a plurality of the containers disclosed herein. That is, there is provided a packaged product comprising a plurality of the containers disclosed herein.

The invention will now be described in relation to the following non-limiting figures, in which.

Figure 1:
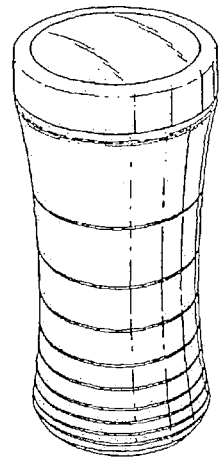
FIG. 1 shows a container suitable for holding the composition described herein.
Figure 2:
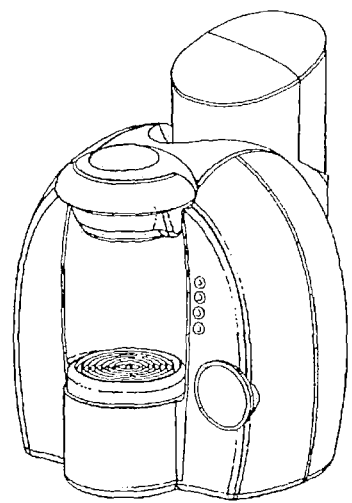
FIG. 2 shows an example of a beverage preparation machine.
Figure 3:
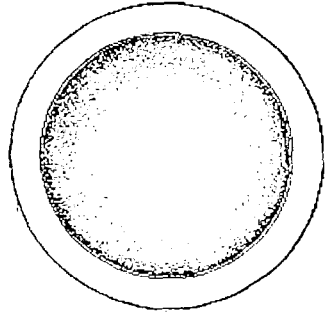
FIG. 3 shows a filter pod suitable for holding the composition described herein.
Figure 4:
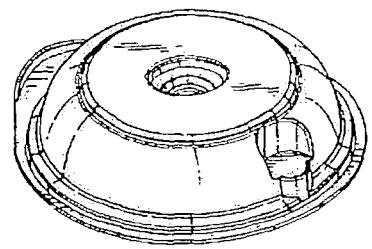
FIG. 4 shows a capsule suitable for holding the composition described herein.
Figure 5:
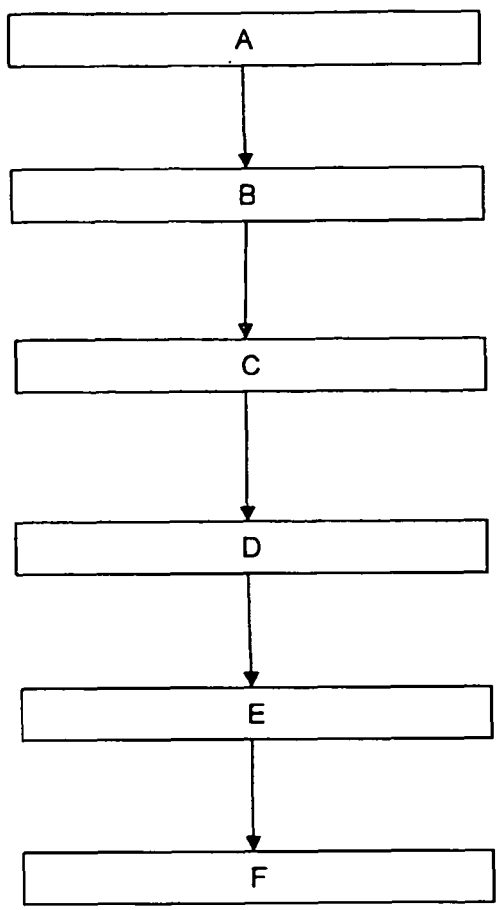
FIG. 5 shows a broad summary of the method described herein.

In step A, roasted coffee beans are ground to a desired size. In step B, the ground roasted coffee beans are mixed with a milk powder. In step C, the mixture is filled into a container, such as a filter paper pod. In step D, a kit is formed of a plurality of the containers. One container is taken in step E and placed into a beverage machine. In step F; an aqueous medium is passed through the container to form a beverage.

The invention will now be described in relation to the following non-limiting examples.

EXAMPLES

Example 1

Examples were performed to investigate the use of a roast and ground coffee with a new coarse grind size design (X50 from 700 μm) to help dissolution of milk powder or dairy creamer mixed with coffee in an all in one pod/capsule.

Example 1A

Coarse grind size roast and ground coffee mixed with skimmed Milk powder (from Milk pod).

| | X10 | X50 | X90 |
|---|---|---|---|
| Agglomerated milk powder | 600 to 800 μm | From 1 to 3 mm | From 3.5 to 4.5 mm |

A pod was prepared using a coarse Carte Noire™ pod coffee (X50: 800 μm) mixed with Skimmed milk powder. The skimmed milk powder was taken from a commercially available milk pod having substantially all of the particles with a particle size of 1-3 mm. These were placed in a filter paper pod and it was found that the composition improves the milk powder dissolution from the pod (visual assessment, taste) and the coffee extraction (visual assessment, taste) versus a Carte Noire™ pod commercial coffee (X50 of 350 μm) with the same skimmed milk powder. As a consequence, the taste and mouthfeel of the beverage were improved.

Example 1B

A pod was prepared for making a milky coffee beverage in a single step. The pod contained 5.5 g of Carte Noire at 800 μm X50 grind size and 4 g of skimmed milk powder (commercial milk pod).

|  | X10 | X50 | X90 |
|---|---|---|---|
| Agglomerated milk powder | 600 to 800 μm | From 1 to 3 mm | From 3.5 to 4.5 mm |

As a comparative example, a similar pod was prepared using 5 g of Carte Noire, also from a classic pod (commercial ground to X50 of 350 μm) and 4 g of skimmed milk powder (commercial milk pod).

If was found that the inventive filter pod provided a beverage with a good appearance and taste. It also had a good foam volume and provided a balanced drink with good coffee intensity and milky mouthfeel.

In contrast, the comparative example mis-brewed. The drink was watery in appearance and taste with a papery note and a lack of mouthfeel.

Example 1C

A pod was prepared for making a milky coffee beverage in a single step. The pod contained 5.5 g of Carte Noire at 800 μm X50 grind size and 4 g of Tesco™ skimmed milk.

As a comparative example, a similar pod was prepared using 5.5 g of Carte Noire, also from a classic pod (commercial ground to X50 of 350 μm) and 4 g of Tesco™ skimmed milk powder.

|  | X10 | X50 | X90 |
|---|---|---|---|
| Non agglomerated skimmed milk powder | 35 μm | 99 μm | 505 μm |

It was found that the inventive filter pod provided a beverage with a good appearance and taste. It also had a good foam volume and provided a balanced drink with good coffee intensity and creamy mouthfeel.

In contrast, the comparative example mis-brewed. The drink was watery in appearance and taste with a papery note and a lack of mouthfeel.

Example 1D

A Tassimo™ capsule was prepared for making a milky coffee beverage in a single step. The capsule contained 5.5 g of Carte Noire at 800 μm X50 grind size and 3.5 g of skimmed milk powder (commercial milk pod).

As a comparative example, a similar Tassimo™ capsule was prepared using 5.5 g of Carte Noire, also from a classic pod (commercial ground to X50 of 350 μm) and 3.5 g of Tesco™ skimmed milk powder (commercial milk pod).

If was found that the inventive capsule provided a beverage with a good appearance and good foam volume. It was a balanced drink with a good coffee intensity and creamy mouthfeel.

In contrast, the comparative example mis-brewed. There appeared to have been a pressure increase which led to a low volume delivery (about one fifth of the intended volume).

Example 2

Three products were compared. The products were as follows:

1. French Senseo Cappuccino Product:

The ingredients were provided in a filter paper pod having a rigid plastic insert to support a layer of roast and ground coffee above the soluble milk powder ingredients.

The pod was an XL sized pod designed to be held in a two-cup holder and brewed with 100 ml of beverage medium (the 1 cup button). The pod contained 12.5 g of beverage ingredients.

The ingredients were: 44 wt % roast and ground coffee having a X50 of 411 μm; 23 wt % skimmed milk powder; and the balance glucose syrup, hydrogenated vegetable fat and stabilisers.

2. German Senseo Cappuccino Product

The ingredients were provided in a filter paper pod having a rigid plastic insert to support a layer of soluble milk powder ingredients above instant coffee powder.

The pod was an XL sized pod designed to be held in a two-cup holder and brewed with 100 ml of beverage medium (the 1 cup button). The pod contained 11.5 g of beverage ingredients.

The ingredients were: 9.8 wt % instant coffee; and the balance skimmed milk powder, sugar, glucose syrup, hydrogenated vegetable fat, flavoring, salt, emulsifier, anti-caking agent and stabilisers.

3. Product According to the Present Disclosure

A filter paper pouch was provided, simply filed with the composition disclosed herein.

The pod was an XL sized pod designed to be held in a two-cup holder and brewed with 100 ml of beverage medium (the 1 cup button). The pod contained 12.5 g of beverage ingredients.

The ingredients were: 45 wt % roast and ground coffee having a X50 of 845 μm; 29 wt % skimmed milk powder; 25 wt % granulated sugar and 1 wt % of cream flavouring.

All three beverages were compared and found to provide comparable satisfactory beverage qualities. However, the cost of preparing the third pod was significantly lower than for the first and second, due to the reduced complexity of the pod design.

Although preferred embodiments of the invention have been described herein in detail, it will be understood by those skilled in the art that variations may be made thereto without departing from the scope of the invention or of the appended claims.

The invention claimed is:

1. A filter paper pod for a beverage preparation machine comprising a composition for making a coffee beverage, the composition comprising:
   roast and ground coffee having a X50 of from 800 to 950 μm; and
   a milk powder with a X50 of from 1 to 3 mm;
   wherein the ratio by weight of the roast and ground coffee to the milk powder is from 7:3 to 1:1, and
   wherein the filter paper pod comprises first and second sheets of filter material sandwiching the beverage composition and sealed around the periphery.

2. The filter paper pod according to claim 1, wherein the coffee has:
(i) a X10 of from 250 to 400 μm; and/or
(ii) a X90 of from 1500 to 2000 μm.

3. The filter paper pod according to claim 1, wherein the ratio by weight of the roast and ground coffee to the milk powder is about 3:2.

4. The filter paper pod according to claim 1, the composition further comprising sugar in an amount of up to 25% by weight of the total composition.

5. The filter paper pod according to claim 4, wherein the sugar is granulated sugar.

6. The filter paper pod according to claim 1, the composition further comprising one or more flavourings.

7. The filter paper pod according to claim 6, wherein the one or more flavourings are present in an amount of less than 5 wt %.

8. The filter paper pod according to claim 1, the composition consisting of the roast and ground coffee and the milk powder, and, optionally, sugar and one or more flavourings, together with any unavoidable impurities.

9. The filter paper pod according to claim 1, wherein the roast and ground coffee has a colour of 4 to 10 La.

10. The filter paper pod according to claim 1, wherein the roast and ground coffee is formed from 50 to 100% by weight Arabica coffee beans and, where present, the balance is formed from Robusta coffee beans.

11. The filter paper pod according to claim 1, wherein the roast and ground coffee is formed from Arabica coffee beans and has a X50 of about 900 μm and a colour of about 9.5 La, and
wherein the ratio by weight of the roast and ground coffee to the milk powder is about 3:2.

12. The filter paper pod according to claim 1, wherein the milk powder has:
(i) a X10 of from 600 to 800 μm; and/or
(ii) a X90 of from 3500 to 4500 μm.

13. The filter paper pod of claim 1, wherein a fill weight of the composition in the filter paper pod is 4-25 g.

14. A method for the manufacture of the filter paper pod of claim 1, the method comprising:
grinding roasted coffee beans, and
mixing the roast and ground coffee with a milk powder, the method further comprising filling the composition into a filter paper pod to form the filter paper pod of claim 1.

15. A method of manufacturing a beverage in a beverage preparation machine, the method comprising:
introducing the filter paper pod of claim 1 into a beverage preparation machine; and
passing an aqueous medium through the filter paper pod to produce a beverage.

16. The method according to claim 15, wherein the beverage has a volume of 70-250 ml.

17. The method according to claim 15 wherein the total solids of the beverage is from 16-20%.

18. The filter paper pod according to claim 6, wherein the one or more flavourings are selected from cream, almond, amaretto, anise, apple, brandy, caramel, cider, cinnamon, panna, cream, milk, cherry, chocolate, mint, cocoa, crème de menthe, soluble coffee, French vanilla, grape, hazelnut, Irish cream, lemon, macadamia nut, orange, peach, peppermint, pistachio, strawberry, vanilla, wintergreen, and a mixture of two or more thereof.

* * * * *